United States Patent [19]

Rosauer

[11] Patent Number: 5,832,086
[45] Date of Patent: Nov. 3, 1998

[54] METHOD FOR UPDATING A COMMUNICATION UNIT PARAMETER IN A WIRELESS COMMUNICATION SYSTEM

[75] Inventor: Matthew M. Rosauer, Chicago, Ill.

[73] Assignee: Motorola, Inc., Schaumburg, Ill.

[21] Appl. No.: 534,605

[22] Filed: Sep. 27, 1995

[51] Int. Cl.[6] .................................................. H04L 9/16
[52] U.S. Cl. ............................................. 380/21; 455/519
[58] Field of Search .................................. 380/21, 23, 49; 455/519, 520

[56] References Cited

U.S. PATENT DOCUMENTS

| | | | |
|---|---|---|---|
| 5,208,859 | 5/1993 | Bartucci et al. | 380/21 X |
| 5,325,432 | 6/1994 | Gardeck et al. | 380/21 |
| 5,381,479 | 1/1995 | Gardeck et al. | 380/21 |
| 5,404,404 | 4/1995 | Novorita | 380/21 |
| 5,528,691 | 6/1996 | Rosauer et al. | 380/21 |
| 5,619,572 | 4/1997 | Sowa | 380/21 |
| 5,708,711 | 1/1998 | Rosauer et al. | 380/21 |

*Primary Examiner*—George M. Dombroske
*Assistant Examiner*—Paul D. Amrozowicz
*Attorney, Agent, or Firm*—Christopher P. Moreno

[57] ABSTRACT

In one embodiment of the present invention, an update method preference value (401) is determined as between a group update method and an individual update method for a wireless communication system (100). Also, a plurality of communication units are partitioned into at least one group, which at least one group is further partitioned into at least one subgroup (402). Once partitioned, a number of communication units in the at least one subgroup is determined (403) and, along with the update method preference value, is applied to a predetermined function to select an update method (404). The update method is used to update a communication unit parameter in communication units included in the at least one subgroup (405). Using this method, the update of communication unit parameters can be achieved automatically through the use of group and individual updates.

10 Claims, 3 Drawing Sheets

METHOD FOR UPDATING A COMMUNICATION UNIT PARAMETER IN A WIRELESS COMMUNICATION SYSTEM

CROSS-REFERENCE TO RELATED APPLICATIONS

Related subject matter is disclosed in U.S. application Ser. No. 08/535,311 now U.S. Pat. No. 5,708,711 entitled METHOD FOR SELECTING A PREFERRED TIME INTERVAL IN WHICH TO UPDATE A COMMUNICATION UNIT PARAMETER, issued to Rosauer et al.

FIELD OF THE INVENTION

The present invention relates generally to wireless communication systems and, in particular, to a method for updating a communication unit parameter.

BACKGROUND OF THE INVENTION

Wireless communication systems are well-known. Such systems typically include a plurality of communication units that transceive wireless communication resources with each other and a fixed infrastructure The fixed infrastructure typically comprises base stations/repeaters that also transceive the wireless communication resources. In some systems, such as a PRIVACY PLUS® system by Motorola, Inc., the base stations operate under the direction of a central controller that controls allocation of the wireless communication resources. Regardless, it is often the case that the communication units include various communication unit parameters used for their normal operation. An example of such a parameter is an encryption key, as known in the art, used for the encryption and decryption of digitally transmitted voice and data communications. Other communication unit parameters are known to require updates, such as inhibit/enable status.

As known in the art, such communication unit parameters need to be updated from time to time. An encryption key is a good example of a communication unit parameter that must be updated relatively frequently in order to maintain proper security levels. Various methods are typically used for updating communication unit parameters. In a first prior art method, each communication unit in the system is physically brought to a central location (e.g., a service shop) for "manual" reprogramming. This method is useful in systems comprising only a small number of communication units; in larger systems, it is inefficient and prone to human error.

Another prior art method, particularly related to the update of encryption keys, is generally described as over-the-air rekeying (OTAR). With OTAR, new encryption keys are sent to communication units using messages directed to either groups of communication units or individual communication units. OTAR is an improvement over the manual update method in that the rekeying process is implemented via the wireless communication resources in the system, thereby eliminating the need to physically bring the communication units in for reprogramming. However, OTAR, as it currently exists, requires an operator of the system to keep track of which communication units require group update message and which individual communication units require individual messages. Naturally, keeping track of which units require group messages and which units require individual messages can become an extremely complex and error-prone task in systems having a large number of communication units. This task is further complicated by the possibility that one or more communication units targeted for a group message may actually miss the group message, and thereafter require an individual update message. While an improvement over manual updating, OTAR still requires a substantial amount of effort to accomplish the desired updating process.

Therefore, a need exists for a method of performing updates of communication unit parameters which overcome the above-described prior art limitations. Such a method should incorporate the benefits of OTAR while substantially eliminating potential confusion in tracking group and individual update requirements.

DESCRIPTION OF A PREFERRED EMBODIMENT

In general, the present invention provides a method for performing updates of communication unit parameters in a wireless communication system. An update method preference value is determined for the wireless communication system.

In one embodiment of the present invention, the update method preference value is determined as between a group update method and an individual update method. A plurality of communication units are partitioned into at least one group, which at least one group is further partitioned into at least one subgroup. Communication units within the at least one group are commonly and individually addressable.

Once partitioned, a number of communication units in the at least one subgroup is determined and, along with the update method preference value, is applied to a predetermined function to select an update method. Once selected, the update method is used to update a communication unit parameter in the communication units included in the at least one subgroup. In a preferred embodiment, the above-described method is carried out by a key management controller, wherein the communication unit parameter may comprise at least one encryption key or an encryption map index. Using this method, the update of communication unit parameters can be achieved automatically through the use of group and individual updates.

Figure 1:
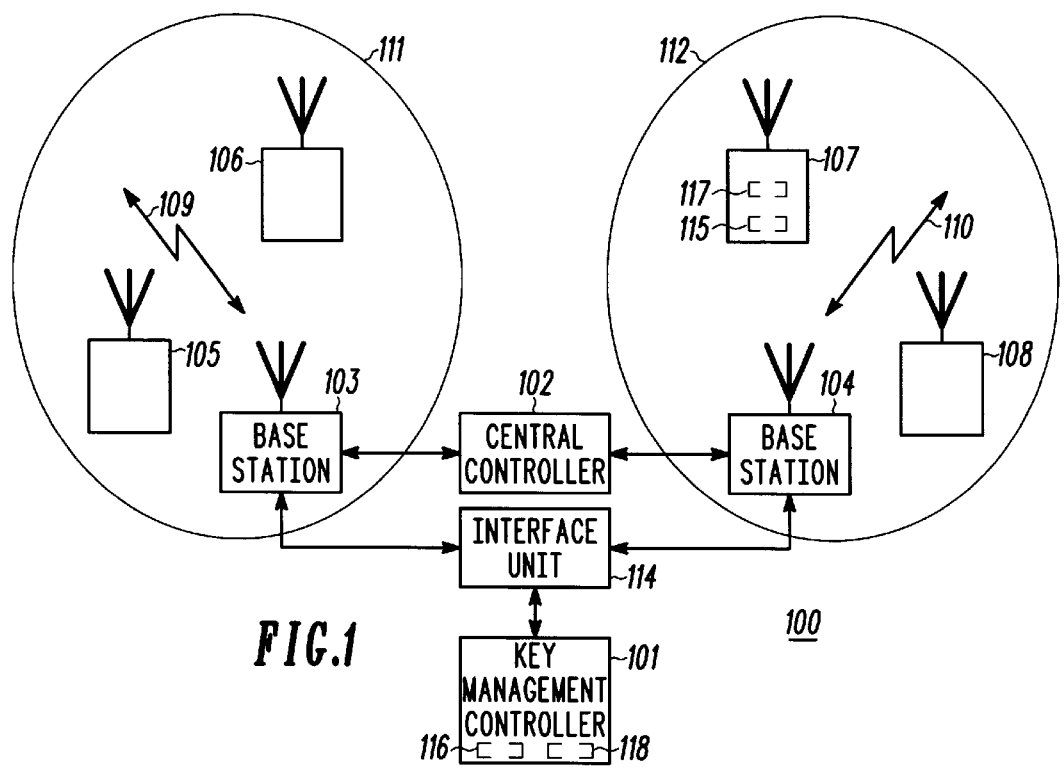
FIG. 1 is a block diagram of a wireless communication system that incorporates a key management controller.

The present invention can be more fully described with reference to FIGS. 1–5. FIG. 1 is a block diagram of a wireless communication system 100 that incorporates a key management controller 101. The wireless communication system 100 also comprises a central controller 102, base stations 103–104, a plurality of communication units 105–108, and wireless communication resources 109–110. In systems operating as trunked communication systems, the central controller 102 controls the allocation of the wireless communication resources 109–110. The wireless communication resources 109–110 may comprise radio frequency (RF) channels such as pairs of frequency carriers, time-division multiplexed (TDM) slots, or any other RF transmission media.

Each base station 103–104, which can be a QUANTAR™ base station by Motorola, Inc., in transceiving the wireless communication resources 109–110 with the communication units 105–108, establishes a corresponding coverage area 111–112. For the sake of clarity, two base stations are shown; in practice any number of base station can be used. In a preferred embodiment, the communication units 105–108 comprise in-hand portable units and/or in-car mobile units capable of encrypted two-way communications, such as ASTRO™ SPECTRA® radios by Motorola, Inc. Although shown in only one for simplicity, each communication unit 105–108 includes memory 115, such as random access memory (RAM) and/or read-only memory (ROM), and a processor 117, such as a microprocessor and/or digital signal processor.

The key management controller 101 communicates with the base stations 103–104 via one or more interface units 114 (only one shown). Suitable key management controllers and interface units are known in the art. The key management controller 101 includes memory 116 and a processor 118 that are, at a minimum, as functionally capable as the memory 115 and processor 117 used in the communication units 105–108. The memories 115–116 and processors 117–118 are used in accordance with well known programming techniques for the storage and execution of software algorithms. In a preferred embodiment, the key management controller 101 generates and stores at least one encryption key in accordance with known encryption techniques. Furthermore, the key management controller 101 generates an encryption map index, as described below.

Figure 2:
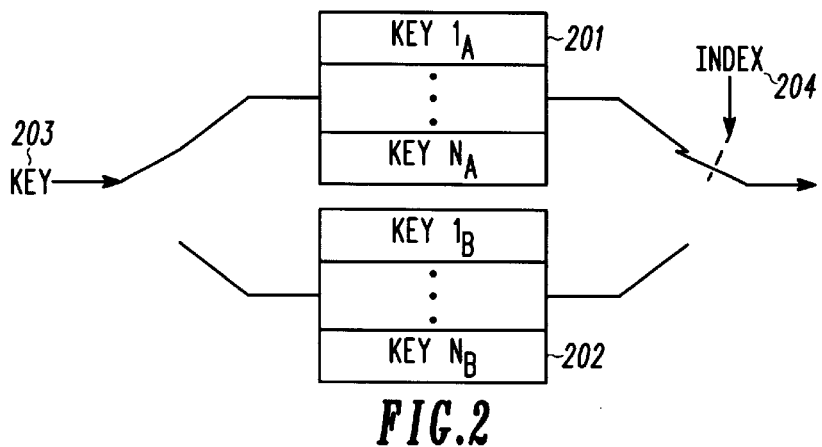
FIG. 2 is a block diagram illustrating storage and selection of encryption keys.

FIG. 2 is a block diagram illustrating storage and selection of encryption keys. The storage and selection shown is implemented using the memories 115 and processors 117 included in each of the communication units 105–108. As shown, a first encryption map 201 and a second encryption map 202 are provided, although any number of such encryption maps could be used. The first encryption map 201 includes a plurality of encryption keys labeled "KEY $i_A$" and the second encryption map 202 includes a plurality of encryption keys labeled "KEY $i_B$", where i=1 to N. As one or more updated encryption keys 203 are received via a group or individual update message, they are stored in either of the encryption maps 201–202. An encryption map index 204 is also received as a communication unit parameter used to indicate that encryption map from which encryption keys are to be selected for the encryption/decryption of voice and data communications. In this manner, keys can be updated without temporarily interrupting encrypted voice and data communications.

Figure 3:
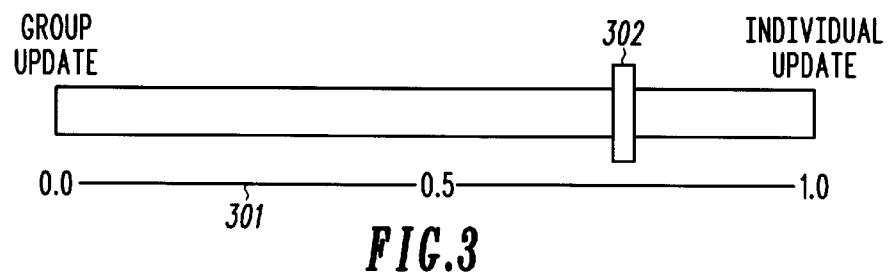
FIG. 3 illustrates an exemplary configuration for the selection an update method preference value.
Figure 4:
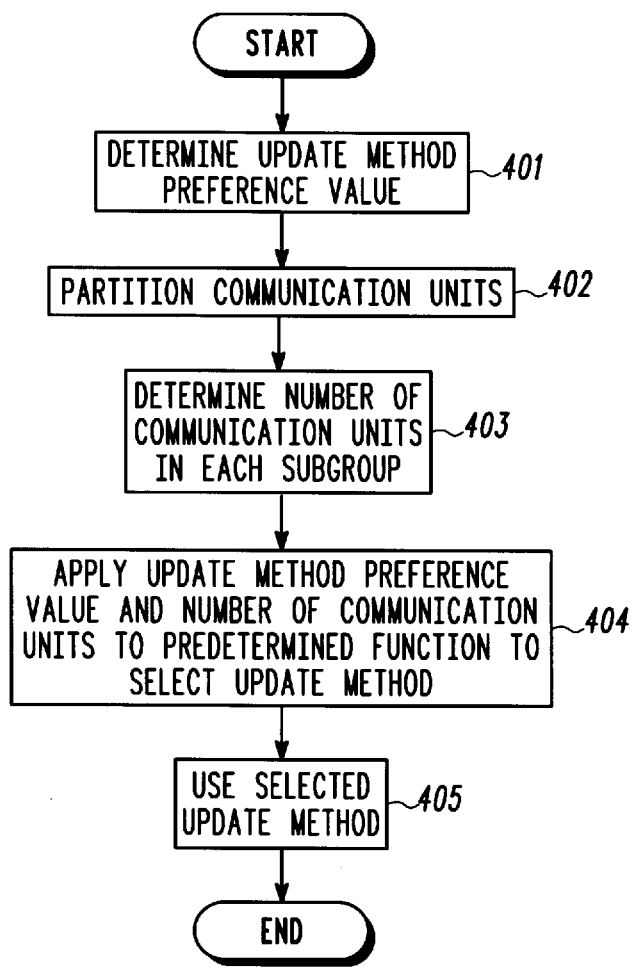
FIG. 4 is a flow chart illustrating an embodiment of the present invention.

FIG. 4 is a flow chart illustrating an embodiment of the present invention. The flowchart of FIG. 4 is preferably implemented using software algorithms stored and executed by the memory 116 and processor 118 of the key management controller 101. At step 401, an update method preference value is determined. The determination of the update method preference value can be performed at the time of system setup or can be performed each time a communication unit parameter needs to be updated. The update method preference value, as described below, reflects a preference for either of two possible methods to be used for the updating of communication unit parameters throughout a system. The determination of the update method preference value is based on a selection made corresponding to the update method preference value, as described below with reference to FIG. 3.

FIG. 3 illustrates an exemplary configuration for the selection of an update method preference value. In particular, a sliding selector 302 is provided. The selector 302 is provided as part of a user interface portion of the key management controller 101 and can be implemented using hardware, such as a rheostat arrangement, or software, such as a graphical user interface (GUI). The selector 302 can be placed, by a user, anywhere within a value range 301, which in a preferred embodiment varies from 0 to 1, inclusive. Of course, other limits on the value range 301 could also be used.

Regardless of the limits used, either extreme of the value range 301 corresponds to a relative preference for either a group update method or an individual update method. The group update method comprises the process of sending a group message for the purpose of updating a communication unit parameter. On the other hand, the individual update method comprises the process of sending individual messages for the purpose of updating a communication unit parameter.

In the example shown, the value 0 corresponds to the group update method and the value 1 corresponds to the individual update method. Although this correspondence is arbitrary, it shall be assumed hereinafter. Thus, when the selector 302 is positioned such that the update method preference value is determined to be 0, the update method preference value reflects an absolute preference for the group update method over the individual update method. As the selector 302 is positioned farther to the right, but still less than the 0.5 value, the resulting update method preference value will reflect an increasing preference for the individual update method, though still less than the preference for the group update method. If the selector 302 is positioned at the 0.5 value, the resulting update preference value will reflect that the group and individual update methods are preferred equivalently, i.e., no preference for either. As the selector 302 is positioned to the right of the 0.5 value, the resulting update method preference value will reflect an increasing preference for the individual update method which is greater than the preference for the group update method, ultimately resulting in an absolute preference for the individual update method over the group update method when positioned at the 1 value.

At step 402, the communication units 105–108 are partitioned into at least one group, and the at least one group is further partitioned into at least one subgroup. Such partitioning can be performed at the time of system setup or can be performed each time a communication unit parameter needs to be updated. For example, in the case of an encrypted system, the at least one group may comprise one or more rekey groups and the at least one subgroup may comprise those units within a rekey group having identical preferred coverage areas. Methods for determining a preferred coverage area for a communication unit are known in the art. The rekey groups are partitioned according to groups of units that need to receive encryption key updates at substantially the same time. Regardless of the basis for partitioning the groups and subgroups, within the at least one group, each communication unit is commonly and individually addressable. That is, a message can be sent to each communication unit in the at least one group using either a group message (commonly addressable) or an individual message (individually addressable).

At step 403, a number of communication units within each of the at least one subgroups is determined. As with the step of partitioning (step 402), the determination of the number of communication units within each subgroup can be performed at the time of system setup or can be performed each time a communication unit parameter needs to be updated.

At step 404, the update method preference value and the number of communication units within each of the at least one subgroups are applied to a predetermined function to select an update method for each subgroup, as described in detail below. Once selected, the update method for each subgroup is used, at step 405, to update the communication unit parameter in the communication units for the corresponding subgroup. Thus, if the group update method is selected for a first subgroup, a group message, comprising the updated communication unit parameter, is sent to all of the communication units in the first subgroup. If, for a second subgroup, the individual update method is selected, individual messages are sent to each communication unit in the second subgroup. The selection of the update method for a given subgroup, based on the update method preference value and the number of communication units for that subgroup, is discussed in greater detail with reference to FIG. 5.

Figure 5:
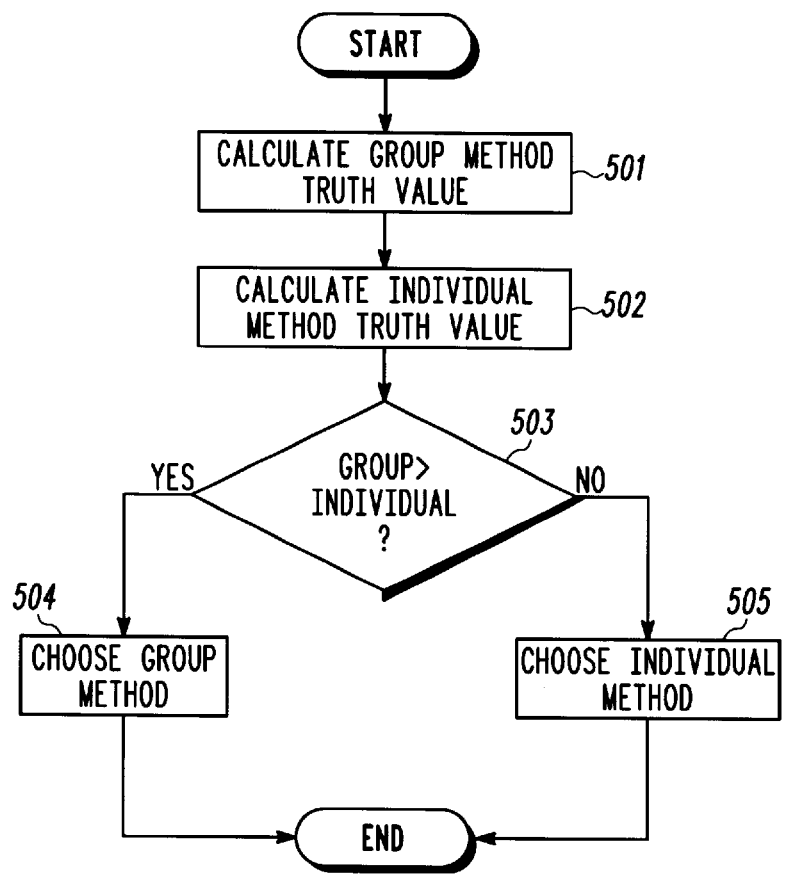
FIG. 5 is a flow chart illustrating in greater detail a step of the embodiment in FIG. 4.

FIG. 5 is a flow chart illustrating in greater detail a step of the embodiment in FIG. 4. In particular, the step of determining the update method (step 404) is further described. At steps 501 and 502, respectively, a group method truth value and an individual method truth value are calculated. As their names would imply, the group method truth value and the individual method truth value each express a relative amount of "truth" for a given statement. Thus, the group method truth value expresses the relative amount of truth for the statement "the group update method is preferred for this subgroup" whereas the individual method truth value expresses the relative amount of truth for the statement "the individual update method is preferred for this subgroup". The group method truth value and the individual method truth value are each calculated by processing the update method preference value and the number of communication units for a given subgroup through the predetermined function.

An example of the predetermined function is given by the following formulas, where the operator "Truth{statement}" calculates the relative truth of the statement on a scale from 0 (not true) to 1 (true), "uc" is the number of communication units within the given subgroup, and "umpv" is the update method preference value:

Truth{unit count is very low}
$$= \left(1 - \left(\frac{uc-1}{10}\right)\right)^2 \quad \text{for } 1 <= uc <= 11$$
$$= 0 \quad \text{for } uc > 11$$

Truth{unit count is not very low}
$$= 1 - \left(1 - \left(\frac{uc-1}{10}\right)\right)^2 \quad \text{for } 1 <= uc <= 11$$
$$= 0 \quad \text{for } uc > 11$$

Truth{user prefers individual rekeys}
$$= umpv$$

Truth{user prefers group rekeys}
$$= 1 - umpv$$

Truth{user prefers all individual rekeys}
$$= 1 \quad \text{for } 0.99 <= umpv <= 1.0$$
$$= \frac{(umpv - 0.95)}{0.04} \quad \text{for } 0.95 <= umpv < 0.99$$
$$= 0 \quad \text{for } 0 <= umpv < 0.95$$

-continued

Truth{user prefers all group rekeys}
$$= 0 \quad \text{for } 0.05 <= umpv <= 1.0$$
$$= \frac{(0.05 - umpv)}{0.04} \quad \text{for } 0.01 <= umpv < 0.05$$
$$= 1 \quad \text{for } 0.0 <= umpv < 0.01$$

Truth{do group rekey}
= (Truth{unit count is not very low} *
   Truth{user prefers group rekeys}) +
   Truth{user prefers all group rekeys}

Truth{do individual rekey}
= (Truth{unit count is very low} *
   Truth{user prefers individual rekeys}) +
   Truth{user prefers all individual rekeys}

At this point, "Truth(do group rekey)" is the group method truth value and "Truth(do individual rekey)" is the individual method truth value calculated at steps 501 and 502, respectively. Those of ordinary skill in the art will recognize that other predetermined functions could be used to achieve similar results.

At step 503, the group method truth value is compared to individual method truth value. If the group method truth value is greater than the individual method truth value, then the group update method is selected at step 504 as the update method. On the other hand, if the group method truth value is not greater than (i.e., less than or equal to) the individual method truth value, then the individual update method is selected at step 505 as the update method. In effect, the method described in FIG. 5 uses the predetermined function to weigh the relative preference for a group versus individual update method given the current state of the update method preference value and the current number of communication units in a given subgroup. As such, the "best" update method for a given subgroup is automatically selected, updates sent to communication units can be performed in the quickest and most efficient manner.

Although the present invention has been described above with respect to encryption keys and an encryption map index as used by a key management controller, those of ordinary skill in the are will recognize that the present invention can be incorporated for use in any system that performs updates of one or more communication unit parameters.

The present invention provides a method for performing updates of communication unit parameters in a wireless communication system. Through the selection and determination of an update method preference value as applied to a predetermined function, the relative preference for either a group or individual update method can be automatically determined for each subgroup included in the system. In this manner, updates sent to communication units can be performed quickly and efficiently.

I claim:

1. In a wireless communication system that includes a plurality of communication units, a method for updating a communication unit parameter comprising steps of:

determining an update method preference value for the wireless communication system;

partitioning the plurality of communication units into at least one group and partitioning the at least one group into at least one subgroup, wherein communication units of the at least one group are individually and commonly addressable within the wireless communication system;

for each subgroup of the at least one subgroup:

determining a number of communication units within the subgroup;

applying the update method preference value and the number of communication units to a predetermined function to select an update method; and using the update method to update the communication unit parameter in the communication units of the subgroup.

2. The method of claim 1, further comprising the step of selecting the update method preference value between a group update method and an individual update method.

3. The method of claim 2, further comprising the step of partitioning the at least one group into the at least one subgroup based on at least one coverage area within the wireless communication system.

4. The method of claim 2, the step of applying the update method preference value and the number of communication units to the predetermined function to select the update method further comprising steps of:

calculating a group method truth value based on the update method preference value and the number of communication units as applied to the predetermined function;

calculating an individual method truth value based on the update method preference value and the number of communication units as applied to the predetermined function;

choosing the group update method as the update method when the group method truth value is greater than the individual method truth value; and choosing the individual update method as the update method when the group method truth value is not greater than the individual method truth value.

5. The method of claim 4, further comprising the step of using the update method to update the communication unit parameter in the communication units of the subgroup, wherein the communication unit parameter is at least one encryption key.

6. The method of claim 4, further comprising the step of using the update method to update the communication unit parameter in the communication units of the subgroup, wherein the communication unit parameter is an encryption map index.

7. In an key management controller that includes a processor, wherein the key management controller operates within a wireless communication system and controls encryption keys for a plurality of communication units within the wireless communication system, a method for updating at least one encryption key comprising steps of:

determining an update method preference value between a group update method and an individual update method for the wireless communication system;

partitioning the plurality of communication units into at least one group and partitioning the at least one group into at least one subgroup, wherein communication units of the at least one group are individually and commonly addressable within the wireless communication system;

for each subgroup of the at least one subgroup:

determining a number of communication units within the subgroup;

applying the update method preference value and the number of communication units to a predetermined function to select one of either the group update method or the individual update method to produce a selected update method; and using the selected update method to update the at least one encryption key, via the wireless communication system, in the communication units of the subgroup.

8. The method of claim 7, the step of applying the update method preference value and the number of communication units to the predetermined function to produce a selected update method further comprising steps of:

calculating a group method truth value based on the update method preference value and the number of communication units as applied to the predetermined function;

calculating an individual method truth value based on the update method preference value and the number of communication units as applied to the predetermined function;

choosing the group update method as the selected update method when the group method truth value is greater than the individual update truth value; and choosing the individual update method as the selected update method when the group method truth value is not greater than the individual method truth value.

9. In an key management controller that includes a processor, wherein the key management controller operates within a wireless communication system and controls an encryption map index for a plurality of communication units within the wireless communication system, a method for updating the encryption map index comprising steps of:

determining an update method preference value between a group update method and an individual update method for the wireless communication system;

partitioning the plurality of communication units into at least one group and partitioning the at least one group into at least one subgroup, wherein communication units of the at least one group are individually and commonly addressable within the wireless communication system;

for each subgroup of the at least one subgroup:

determining a number of communication units within the subgroup;

applying the update method preference value and the number of communication units to a predetermined function to select one of either the group update method or the individual update method to produce a selected update method; and using the selected update method to update the encryption map index, via the wireless communication system, in the communication units of the subgroup.

10. The method of claim 9, the step of applying the update method preference value and the number of communication units to the predetermined function to produce a selected update method further comprising steps of:

calculating a group method truth value based on the update method preference value and the number of communication units as applied to the predetermined function;

calculating an individual update truth value based on the update method preference value and the number of communication units as applied to the predetermined function;

choosing the group update method as the selected update method when the group method truth value is greater than the individual update truth value; and choosing the individual update method as the selected update method when the group method truth value is not greater than the individual method truth value.

* * * * *